United States Patent [19]

Berfield et al.

[11] Patent Number: 4,984,330
[45] Date of Patent: Jan. 15, 1991

[54] NOZZLE ASSEMBLY FOR A VACUUM DEVICE

[75] Inventors: Robert C. Berfield, Jersey Shore; Ronald F. Meland, Muncy, both of Pa.

[73] Assignee: Shop-Vac Corporation, Williamsport, Pa.

[21] Appl. No.: 385,966

[22] Filed: Jul. 27, 1989

Related U.S. Application Data

[63] Continuation of Ser. No. 171,145, Mar. 16, 1988, abandoned, which is a continuation of Ser. No. 938,850, Dec. 8, 1986, abandoned.

[51] Int. Cl.[5] ............................................. A47L 9/02
[52] U.S. Cl. ................................. 15/415.1 R; 285/7; 285/376; 285/401
[58] Field of Search ............................................. 15/416

[56] References Cited

U.S. PATENT DOCUMENTS

| 607,105 | 7/1898 | Wilkinson | 15/176.6 |
| 2,586,145 | 2/1952 | Breuer et al. | 15/415 R |
| 3,286,295 | 11/1966 | Fromknecht | 285/7 |
| 3,306,634 | 2/1967 | Groves et al. | 285/7 |
| 3,309,113 | 3/1967 | Beach | 285/7 |
| 3,314,039 | 4/1967 | Opper | 15/415 R |
| 3,739,422 | 6/1973 | Johnson et al. | 15/397 |
| 3,832,753 | 9/1974 | Crooks | 15/415 R |
| 3,869,751 | 3/1975 | Boyd et al. | 285/7 |
| 4,449,737 | 11/1984 | Specht | 285/7 |
| 4,558,889 | 12/1985 | Gans | 285/7 |
| 4,564,972 | 1/1986 | Varin | 15/415 R |
| 4,625,998 | 12/1986 | Draudt et al. | 285/7 |

FOREIGN PATENT DOCUMENTS

| 6513575 | 6/1966 | Netherlands | 285/7 |
| WO81/00748 | 3/1981 | PCT Int'l Appl. | |
| 482347 | 3/1938 | United Kingdom | 285/401 |
| 659656 | 6/1949 | United Kingdom | |
| 637468 | 5/1950 | United Kingdom | |
| 963910 | 7/1964 | United Kingdom | |
| 1025096 | 4/1966 | United Kingdom | |
| 1215980 | 12/1970 | United Kingdom | |
| 1315750 | 5/1973 | United Kingdom | |
| 1362096 | 7/1974 | United Kingdom | |
| 1506610 | 4/1978 | United Kingdom | |
| 2140673 | 12/1984 | United Kingdom | |

Primary Examiner—Philip R. Coe
Assistant Examiner—Mark Spisich
Attorney, Agent, or Firm—Ostrolenk, Faber, Gerb & Soffen

[57] ABSTRACT

An arrangement for attaching a rigid vacuum conduit to a nozzle provides high rotational freedom between the nozzle and the rigid conduit while retaining a reasonable degree of airtightness between the conduit and the nozzle. In one form of the invention, the rigid vacuum conduit includes a coupling section of generally cylindrical form adapted to be received into an inlet opening of the nozzle. The coupling section includes a plurality of spaced grooves, each circumscribing the coupling section. The presence of the grooves reduces the frictional loading between the vacuum conduit and the inlet opening while providing a trap for dirt particles that would otherwise jam the vacuum conduit into fixed position in the nozzle. In a further version of the invention, the rigid vacuum conduit comprises metallic material. To reduce frictional loading between such metallic material and the inlet opening of the nozzle, an annular band of low friction material encircles a coupling section of the vacuum conduit. The annular band may comprise a nonmetallic material and may be formed of a pair of cooperating sections.

3 Claims, 5 Drawing Sheets

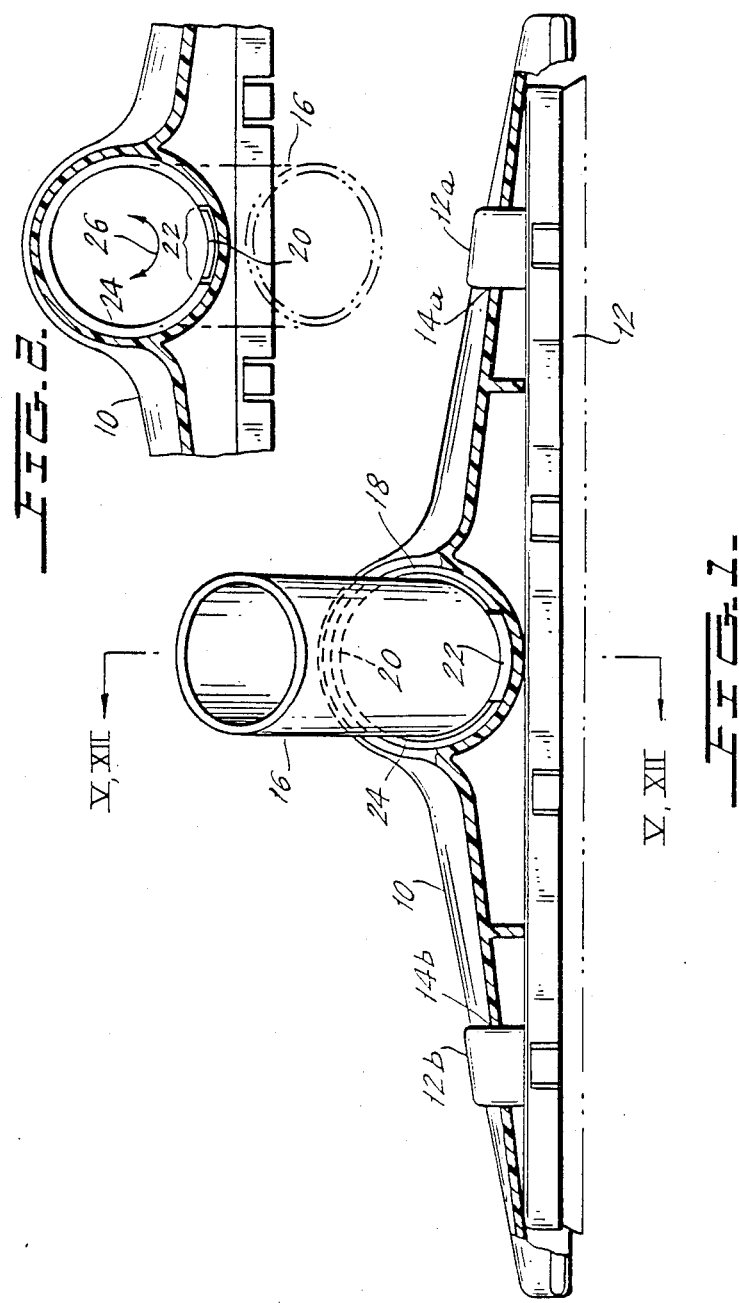

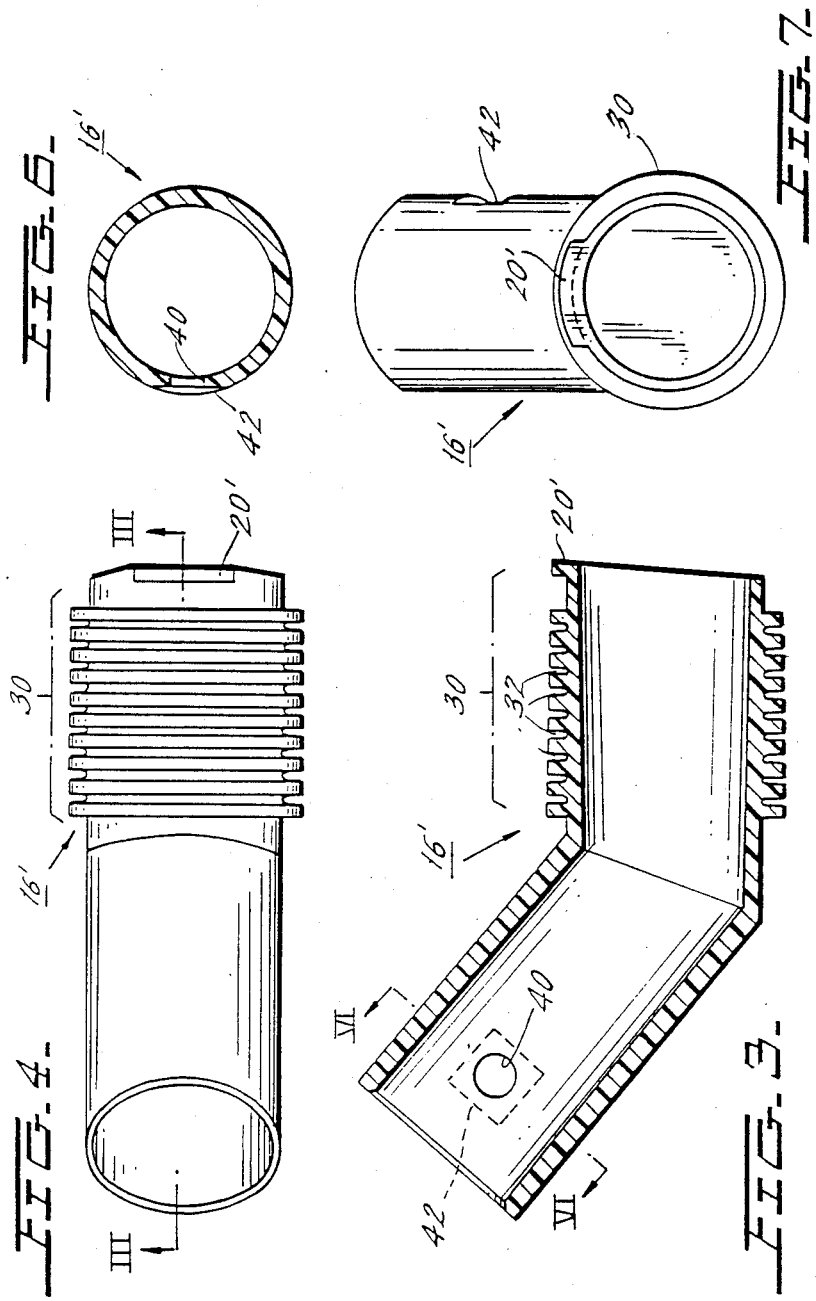

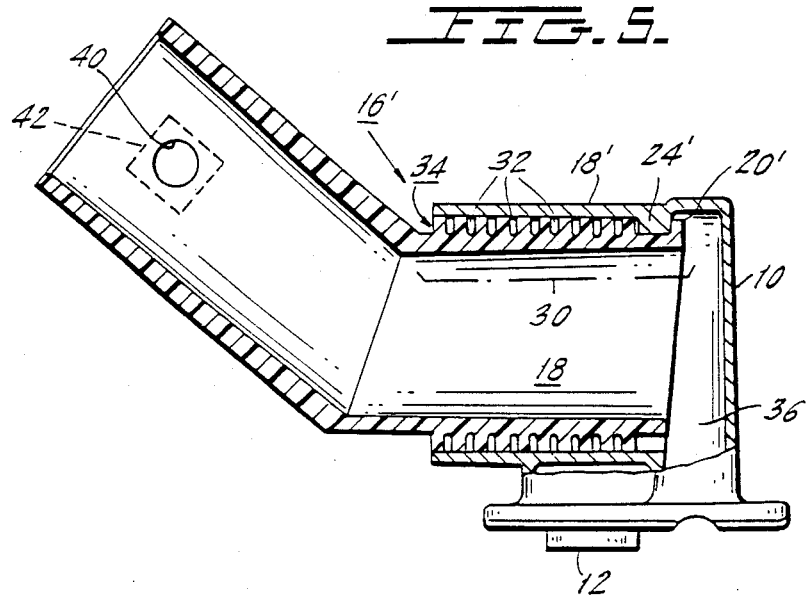
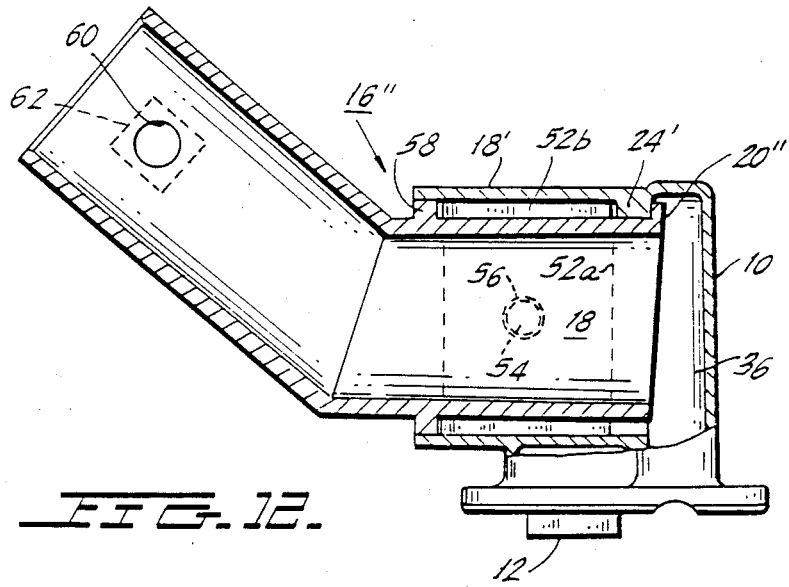

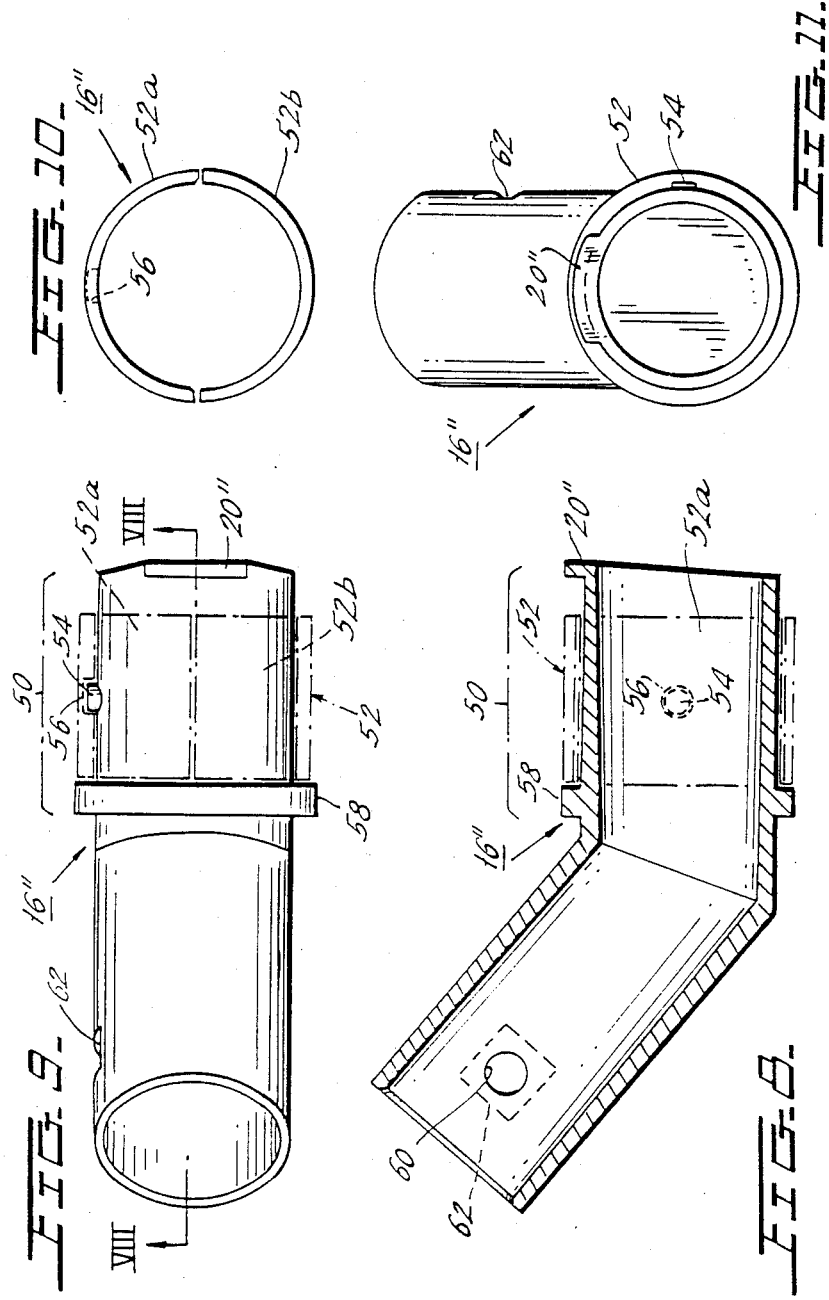

NOZZLE ASSEMBLY FOR A VACUUM DEVICE

This is a continuation of application Ser. No. 171,145 filed on Mar. 16, 1988, and now abandoned, which is a Continuation of application Ser. No. 938,850 filed on Dec. 8, 1986, and now abandoned.

BACKGROUND OF THE INVENTION

The present invention relates to a nozzle assembly for a vacuum device such as a vacuum cleaner, and more particularly to an arrangement for attachment of a rigid vacuum conduit to a nozzle.

Vacuum devices such as vacuum cleaners typically include a nozzle to which a flexible vacuum hose is attached. A rigid vacuum conduit is typically used as an intermediate connection between the flexible vacuum hose and the nozzle. It is often desirable that a high degree of rotational freedom exist between the rigid vacuum conduit and the nozzle to permit the nozzle to rotate as necessary over surfaces of changing contour. On the other hand, vacuum efficiency requires that the coupling between the rigid vacuum conduit and the nozzle be reasonably airtight. It would, thus, be desirable to provide a nozzle assembly achieving a desirable balance between rotational freedom of a nozzle relative to a rigid vacuum conduit, and the airtightness of the connection between the vacuum conduit and the nozzle.

It would be additionally desirable to provide an arrangement for coupling between a rigid vacuum conduit and a nozzle that is resistant to jamming in the presence of dirt particles trapped in the connection region.

OBJECTS AND SUMMARY OF THE INVENTION

Accordingly, it is an object of the present invention to provide an arrangement for coupling a vacuum conduit to a nozzle in which a desirable balance between rotational freedom of the nozzle relative to the vacuum conduit and airtightness of the connection is maintained.

A further object of the invention is to provide an arrangement for coupling between a rigid vacuum conduit and a nozzle for a vacuum device wherein the arrangement is resistant to jamming due to dirt particles entrapped in the connection region.

A further object of the invention is to provide an arrangement for coupling between a rigid vacuum conduit and a nozzle of a vacuum device in which a high degree of rotational freedom is maintained between the rigid conduit and the nozzle where the rigid conduit comprises metallic material.

In summary, a nozzle assembly for a vacuum device in accordance with one version of the invention includes a nozzle and a suction conduit. The nozzle has an inlet opening of generally cylindrical shape. The suction conduit has a coupling section of generally cylindrical shape for insertion into the inlet opening. The adjacent portions of the coupling section and the inlet opening define an interface region. The interface region is provided with a plurality of spaced openings for receiving and harmlessly containing debris that otherwise would tend to jam the rigid vacuum conduit in fixed relation to the nozzle.

In accordance with another version of the invention, a nozzle assembly for a vacuum device comprises a nozzle with an inlet opening of generally cylindrical shape, and a rigid suction conduit having a coupling section of generally cylindrical shape for insertion into the inlet opening. The suction conduit includes an annular band encircling a substantial extent of the coupling section and comprising nonmetallic material. The annular band may comprise a pair of half-round sections. The suction conduit includes a collar around the circumference of the coupling section, providing a stop against movement of the annular band.

Other objects and features of the nozzle assembly of the present invention will be apparent from the following description and accompanying drawings showing preferred embodiments of the invention.

BRIEF DESCRIPTION OF THE DRAWINGS

FIG. 1 is a rear view of a nozzle assembly in accordance with the invention, and is partially in cross-section.

FIG. 2 is detail view of the nozzle assembly of FIG. 1 illustrating how a rigid vacuum conduit is rotated in an inlet opening of the nozzle for locking the conduit to the nozzle.

FIG. 3 is cross-sectional view taken at line III—III in FIG. 4 and illustrating a rigid vacuum conduit in accordance with the invention.

FIG. 4 is an upper plan view of the rigid vacuum conduit of FIG. 3.

FIG. 5 is a cross-sectional view taken at line V—V in FIG. 1 and illustrating a coupling arrangement between the rigid vacuum conduit of FIGS. 3 and 4 and the nozzle of FIG. 1.

FIG. 6 is a cross-sectional view of the rigid vacuum conduit of FIG. 3 and is taken at lines VI—VI thereof.

FIG. 7 is an end plan view of the rigid vacuum conduit of FIG. 4 as viewed from the right-hand side of FIG. 4.

FIG. 8 is a cross-sectional view taken at line VIII—VIII in FIG. 9 and illustrating a rigid vacuum conduit in accordance with a further embodiment of the invention.

FIG. 9 is an upper plan view of the rigid vacuum conduit of FIG. 8.

FIG. 10 is an end view of a pair of annular band sections that together are used to encircle a portion of the rigid vacuum conduit of FIGS. 8 and 9.

FIG. 11 is an end plan view of the rigid vacuum conduit of FIG. 9 as viewed from the right-hand side of FIG. 9.

FIG. 12 is a cross-sectional view taken at lines XII—XII in FIG. 1 and illustrating a coupling arrangement between the rigid vacuum conduit of FIGS. 8 and 9 and the nozzle of FIG. 1.

DETAILED DESCRIPTION OF THE PREFERRED EMBODIMENTS

Figure 13:
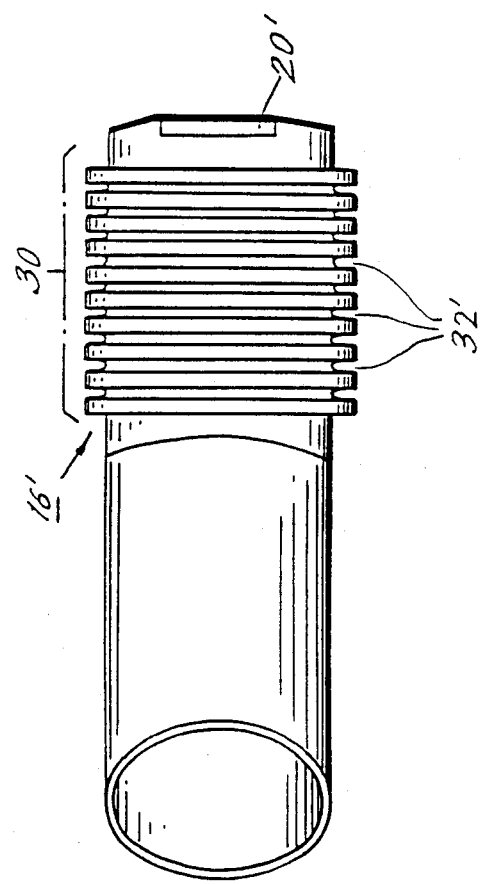
FIG. 13 is an upper plane view of a rigid vacuum conduit like the conduit illustrated in FIG. 4, but with spiral grooves.

FIG. 1 illustrates a nozzle 10 such as is typically used in a vacuum cleaner. The nozzle may include an auxiliary attachment such as a squeegee or brush 12, located rearwardly of a suction channel (not shown) extending from the left to the right of the illustrated nozzle. The squeegee o brush 12 may be attached to the frame of nozzle 10 by the use of projections 12a and 12b extending upwardly respectively through apertures 14a and 14b in the nozzle frame.

A rigid suction conduit 16 is schematically illustrated in FIG. 1 and described in detail below. Vacuum conduit 16 is adapted to be received within an inlet opening 18 in nozzle 10.

The general manner of installation of the vacuum conduit 16 into inlet opening 18 is described with respect to FIGS. 1 and 2. A retaining ring 20 on vacuum conduit 16 is adapted to be received through a gap 22 in a cooperating retaining ring 24 mounted on the nozzle.

With reference to FIG. 2, retaining ring 20 of vacuum conduit 16 is shown extending through gap 22 in retaining ring 24. Thereafter, vacuum conduit 16 is rotated clockwise or counterclockwise as indicated by double-headed arrow 26. Accordingly, retaining ring 20 is secured behind retaining ring 24 of the nozzle in normal usage when the exterior portion of rigid vacuum conduit 16 is rotated upwardly, as shown in FIG. 1, for example.

FIGS. 3 through 7 illustrate various features of a vacuum conduit 16' in accordance with a first embodiment of the invention.

FIGS. 3 and 4 illustrate a coupling section 30 included in conduit 16'. Coupling section 30 is generally cylindrical in shape. It is preferred that coupling section 30 taper slightly from left to right as illustrated in FIGS. 3 and 4, or from without to within in inlet opening 18 (FIG. 1) of nozzle 10. Inlet portion 18 is also preferred to be generally cylindrical in shape and to have a cooperating taper in the same direction as does coupling section 30 so that a reasonably tight fit can be maintained between the vacuum conduit and the nozzle of FIG. 1.

In accordance with a feature of the invention, coupling section 30 comprises a plurality of annular grooves encircling the coupling section and opening outwardly. Grooves 32 may be spaced side-by-side as illustrated or may be in the form of spiral grooves 32' (FIG. 13), for example. The provision of grooves 32 in coupling section 30 reduces the amount of material required to implement vacuum conduit 16'. Additional benefits realized by inclusion of grooves 32 in coupling section 30 are now discussed with reference to FIG. 5.

Turning to FIG. 5, the presence of grooves 32 can be seen to reduce the surface area of contact between coupling section 30 and inlet opening wall 18' of nozzle 10. This reduces the friction load between the vacuum conduit and the nozzle so that the vacuum conduit can rotate more freely within inlet opening 18 during use. The provision of grooves 32, furthermore, provides space for dirt particles, which may accumulate between coupling section 30 and inlet opening wall 18', to be deposited into the grooves. In this manner, the likelihood of jamming of vacuum conduit 16 in inlet opening 18 is reduced. Openings of different configurations than grooves 32 could be provided to fulfill the foregoing functions.

As an alternative to providing grooves or other openings 32 in coupling section 30, interface region 34, comprising the adjacent portions of coupling section 30 and input opening wall 18', could be provided with openings, which could be solely in the wall, or partially in the wall and partially in coupling section 30.

FIG. 5 additionally illustrates a vacuum conduit 36 within nozzle 10 which, in the illustrated device, has a downwardly extending opening as is typical of vacuum cleaner devices.

FIGS. 3 and 6 illustrate an aperture 40 in the side wall of vacuum conduit 16' remote from coupling section 30.

Aperture 40 is adapted to receive a projection from a coupling section of a vacuum hose, not illustrated herein, of conventional construction. Aperture 40 is preferably recessed to a flat face 42 of vacuum conduit 16'.

FIGS. 3 and 7, for example, illustrate retaining ring 20' of vacuum conduit 16'. Retaining ring 20' is preferably an arcuate segment of about 40° or 50°, while the corresponding gap 22 (FIG. 1) in retaining ring 24 of the nozzle is several degrees greater in arcuate extent so as to be able to readily receive retaining ring 20' therethrough. Retaining ring 20' could, however, be modified to occupy a greater arcuate extent if desired.

FIGS. 8–12 illustrate a further vacuum conduit 16" in accordance with another version of the invention. With respect to FIGS. 8 and 9, vacuum conduit 16" can be seen to include a coupling section 50 of generally cylindrical configuration. Further included in coupling section 50 is an annular band 52, which preferably is formed of two sections 52a and 52b. Together, annular band sections 52a and 52b surround at least a substantial portion of the circumference of coupling section 50.

The present embodiment of the invention as illustrated in FIGS. 8 and 9, for example, is preferably implemented with vacuum conduit 16" comprising a metallic or high friction material, while annular band 52 comprises a nonmetallic or low friction material. The provision of annular band 52 then assures free rotational movement of vacuum conduit 16" within input opening 18 (FIG. 1) of nozzle 10.

With reference to FIGS. 8 and 9, coupling section 50 preferably includes an outward projection 54. Cooperating with outward projection 54 is an aperture 56, preferably contained in annular band portion 52a. By locking annular band section 52 against vacuum conduit 16", excessively free rotation of vacuum conduit 16" in input opening 18 (FIG. 1) of nozzle 10 is prevented.

In FIGS. 8 and 9, a collar 58 can be seen included within coupling section 50 of vacuum conduit 16" and located outwardly of annular band 52 with respect to nozzle 10 (FIG. 1). Collar 58 provides a stop against outward movement of annular band 52.

To provide a reasonably tight fit between vacuum conduit 16" and the inlet opening of the nozzle, coupling section 50 is preferably tapered slightly from left to right as illustrated in FIGS. 8 and 9. Similarly, inlet opening 18 (FIG. 1) of nozzle 10 is preferably tapered in the same manner.

Vacuum conduit 16" of FIG. 8 preferably includes an aperture 60 extending inwardly from a flat face 62 in the same manner as aperture 40 and face 42 described above in connection with FIG. 3.

As illustrated in FIGS. 8 and 11, for example, vacuum conduit 16" may include a retaining ring 20" of substantially similar function as retaining ring 20' described above in connection with FIGS. 3 and 7.

FIG. 12 illustrates the inserted position of vacuum conduit 16" in inlet opening 18 of nozzle 10. It can be seen that annular bands 52a and 52b provide the major bearing surface against inlet opening wall 18' of the nozzle. Accordingly, non-jamming rotational movement of vacuum conduit 16" within inlet opening 18 is achieved.

The foregoing describes various nozzle arrangements for a vacuum device that permit a desirable balance between rotational freedom of a vacuum conduit attached to a nozzle and the airtightness of the attachment. A metal vacuum conduit can be accommodated by the invention. One embodiment is particularly resistant to jamming of rotational movement between the vacuum conduit and the nozzle in the presence of dirt particles in the region of attachment.

Although the present invention has been described in connection with a plurality of preferred embodiments thereof, many other variations and modifications will now become apparent to those skilled in the art without departing from the scope of the invention. It is preferred, therefore, that the present invention be limited not by the specific disclosure herein, but only by the appended claims.

What is claimed is:

1. A nozzle assembly for a vacuum device, said nozzle assembly comprising:
   (A) a nozzle having an inlet opening, said inlet opening including:
      (1) a slightly tapered, generally cylindrical internal wall;
      (2) a longitudinal axis through said slightly tapered, generally cylindrical internal wall; and
      (3) an inwardly projecting retaining ring, said retaining ring including a lower gap; and
   (B) a suction conduit, said suction conduit including:
      (1) a generally cylindrical external wall, said generally cylindrical external wall including an end;
      (2) a longitudinal axis through said generally cylindrical external wall; and
      (3) a coupling section for insertion into said inlet opening, said coupling section including:
         (a) an outer surface with grooves extending therearound, said outer surface being slightly tapered and generally cylindrical so as to be cooperable with said slightly tapered, generally cylindrical internal wall of said inlet opening to maintain a reasonably tight fit between said inlet opening and said suction conduit while permitting rotational movement of said suction conduit relative to said inlet opening; and
         (b) an outwardly projecting retaining segment, said retaining segment being located at said end of said generally cylindrical external wall, said retaining segment being adapted to fit through said lower gap of said retaining ring during said insertion into said inlet opening; and
   wherein said retaining ring is arranged with respect to said generally cylindrical internal wall to obtain said reasonably tight fit between said inlet opening and said suction conduit;
   wherein said retaining ring and said retaining segment are adapted to prevent removal of said suction conduit from said inlet opening during normal usage of said nozzle assembly but to permit ready removal of said suction conduit from said inlet opening when desired; and
   wherein said grooves and said generally cylindrical internal wall of said inlet opening are adapted to define an interface region for:
      (a) receiving and harmlessly containing debris that would otherwise tend to jam said suction conduit in fixed relation with respect to said inlet opening; and
      (b) providing a seal between said coupling section and said inlet opening.

2. The nozzle assembly of claim 1, wherein said grooves are spaced side-by-side.

3. The nozzle assembly of claim 1, wherein said grooves define a spiral.

* * * * *